United States Patent
Li et al.

(10) Patent No.: US 10,768,492 B2
(45) Date of Patent: Sep. 8, 2020

(54) ARRAY SUBSTRATE AND MANUFACTURING METHOD THEREOF, DISPLAY PANEL AND DRIVING METHOD THEREOF, AND ELECTRONIC DEVICE

(71) Applicant: BOE TECHNOLOGY GROUP CO., LTD., Beijing (CN)

(72) Inventors: Zhongxiao Li, Beijing (CN); Xiaochuan Chen, Beijing (CN); Wenqing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/116,209

(22) Filed: Aug. 29, 2018

(65) Prior Publication Data

US 2019/0250442 A1  Aug. 15, 2019

(30) Foreign Application Priority Data

Feb. 13, 2018 (CN) .......................... 2018 1 0149805

(51) Int. Cl.
*G02F 1/1343* (2006.01)
*G02F 1/1362* (2006.01)
*G02F 1/1335* (2006.01)
*G02F 1/13* (2006.01)

(52) U.S. Cl.
CPC ...... *G02F 1/134363* (2013.01); *G02F 1/1323* (2013.01); *G02F 1/13624* (2013.01); *G02F 1/133512* (2013.01); *G02F 1/134309* (2013.01); *G02F 1/136286* (2013.01); *G02F 2001/134345* (2013.01)

(58) Field of Classification Search
CPC .......... G02F 1/13624; G02F 1/134363; G02F 1/1323; G02F 2001/134345; G02F 1/133512
See application file for complete search history.

(56) References Cited

U.S. PATENT DOCUMENTS

| | | |
|---|---|---|
| 8,780,308 B2 | 7/2014 | Li et al. |
| 10,235,953 B2 | 3/2019 | Li et al. |
| 2004/0041970 A1 | 3/2004 | Lee et al. |

(Continued)

FOREIGN PATENT DOCUMENTS

| | | |
|---|---|---|
| CN | 102621757 A | 8/2012 |
| CN | 103728754 A | 4/2014 |
| CN | 104122726 A | 10/2014 |

OTHER PUBLICATIONS

First Chinese Office Action Application No. 201810149805.0; dated Jun. 8, 2020.

*Primary Examiner* — Jessica M Merlin

(57) ABSTRACT

An array substrate and a manufacturing method thereof, a display panel and a driving method thereof, and an electronic device are disclosed. The array substrate includes a plurality of sub-pixels arranged in an array; each of the sub-pixels includes a display area and an interference area, the display area and the interference area are disposed side by side and configured to be independently driven, and the interference area is located on at least one side of the display area adjacent to a neighboring sub-pixel; the display area includes a first pixel electrode, the interference area includes a second pixel electrode, and the first pixel electrode is electrically insulated from the second pixel electrode.

13 Claims, 4 Drawing Sheets

(56) References Cited

U.S. PATENT DOCUMENTS

| | | | | |
|---|---|---|---|---|
| 2008/0007684 A1* | 1/2008 | Kim | ................ | G02F 1/1323 |
| | | | | 349/143 |
| 2013/0265514 A1* | 10/2013 | Li | ................ | G02F 1/1343 |
| | | | | 349/41 |
| 2014/0146255 A1* | 5/2014 | Xie | ................ | G02F 1/134363 |
| | | | | 349/37 |
| 2016/0327845 A1* | 11/2016 | Kim | ................ | G02F 1/136286 |
| 2019/0033631 A1* | 1/2019 | Kuo | ................ | G02B 5/003 |

* cited by examiner

ARRAY SUBSTRATE AND MANUFACTURING METHOD THEREOF, DISPLAY PANEL AND DRIVING METHOD THEREOF, AND ELECTRONIC DEVICE

CROSS-REFERENCE TO RELATED APPLICATION

The present application claims priority of the Chinese patent application No. 201810149805.0, filed on Feb. 13, 2018, the disclosure of which is incorporated herein by reference as part of the application.

TECHNICAL FIELD

At least one embodiment of the present disclosure relates to an array substrate and a manufacturing method thereof, a display panel and a driving method thereof, and an electronic device.

BACKGROUND

With the development of electronic science and technology and the demand of social development, liquid crystal display panels have been widely used in various display devices due to their characteristics of lightness, thinness, good shock resistance, wide viewing angle, high contrast and the like. For example, the liquid crystal display panel can be classified into a vertical electric field type liquid crystal display panel and a horizontal electric field type liquid crystal display panel. The horizontal electric field type liquid crystal display panel comprises, for example, an in-plane switching type liquid crystal display panel and an advanced super-dimensional field conversion type liquid crystal display panel. The horizontal electric field type liquid crystal display panel has gradually become a mainstream in the display field due to its advantages of wide viewing angle, high contrast and the like.

SUMMARY

At least one embodiment of the present disclosure provides an array substrate, which comprises a plurality of sub-pixels arranged in an array, wherein each of the sub-pixels comprises a display area and an interference area, the display area and the interference area are disposed side by side and configured to be independently driven, and the interference area is located on at least one side of the display area adjacent to a neighboring sub-pixel; the display area comprises a first pixel electrode, the interference area comprises a second pixel electrode, and the first pixel electrode is electrically insulated from the second pixel electrode.

For example, in the array substrate according to an embodiment of the present disclosure, each of the sub-pixels further comprises a common electrode, and at least one of the first pixel electrode and the second pixel electrode is located in a same layer as the common electrode or in a different layer from the common electrode.

For example, in the array substrate according to an embodiment of the present disclosure, the interference area is located between the display area and the neighboring sub-pixel on each side of the display area.

For example, the array substrate according to an embodiment of the present disclosure further comprises a plurality of interference signal lines, wherein each of the sub-pixels comprises a thin film transistor, the first pixel electrode is electrically connected to a source electrode or a drain electrode of the thin film transistor, and the second pixel electrode is electrically connected to one of the interference signal lines.

For example, in the array substrate according to an embodiment of the present disclosure, second pixel electrodes of the sub-pixels in a same row are electrically connected to a same one of the interference signal lines.

For example, the array substrate according to an embodiment of the present disclosure further comprises a plurality of gate lines and a plurality of data lines, wherein the plurality of gate lines and the plurality of data lines cross each other to define the plurality of sub-pixels; wherein each of the sub-pixels comprises a first thin film transistor and a second thin film transistor; a first terminal of the first thin film transistor is electrically connected to the first pixel electrode, and a first terminal of the second thin film transistor is electrically connected to the second pixel electrode; a gate electrode of the first thin film transistor and a gate electrode of the second thin film transistor are electrically connected to different gate lines; and a second terminal of the first thin film transistor and a second terminal of the second thin film transistor are electrically connected to a same data line or connected to different data lines, respectively.

At least one embodiment of the present disclosure provides a display panel, the display panel comprises the array substrate according to any one of the embodiments of the present disclosure, a liquid crystal layer, and an opposite substrate, wherein the opposite substrate is disposed opposite to the array substrate, and the liquid crystal layer is sandwiched between the opposite substrate and the array substrate.

For example, the display panel according to an embodiment of the present disclosure further comprises a black matrix on the opposite substrate, wherein the black matrix comprises a black matrix line disposed between adjacent sub-pixels, and a line width of the black matrix line allows at least a portion of light emitted from the interference area of each of the adjacent sub-pixels to be irradiated into the adjacent sub-pixels.

For example, in the display panel according to an embodiment of the present disclosure, the line width of the black matrix line is equal to a sum of a line width of the data lines and a double of an alignment error of the black matrix.

For example, the display panel according to an embodiment of the present disclosure further comprises a planarization layer between the array substrate and the opposite substrate, wherein a thickness of the planarization layer enables the portion of the light after passing through the planarization layer to be irradiated into the adjacent sub-pixels.

For example, in the display panel according to an embodiment of the present disclosure, the opposite substrate is a color filter substrate.

At least one embodiment of the present disclosure provides an electronic device, the electronic device comprises the display panel according to any one of the embodiments of the present disclosure.

At least one embodiment of the present disclosure provides a method of manufacturing an array substrate, comprising: forming a plurality of sub-pixels arranged in an array on a base substrate, wherein each of the sub-pixels comprises a display area and an interference area, the display area and the interference area are disposed side by side and configured to be independently driven, and the interference area is located on at least one side of the display area adjacent to a neighboring sub-pixel; and the display area comprises a first pixel electrode, the interference area comprises a second pixel electrode, and the first pixel electrode is electrically insulated from the second pixel electrode.

At least one embodiment of the present disclosure provides a driving method of the display panel, comprising: driving the first pixel electrode of the display area of each of the sub-pixels to display image information; and driving the second pixel electrode of the interference area of each of the sub-pixels to produce an interference effect.

For example, in the driving method of the display panel according to an embodiment of the present disclosure, the first pixel electrode is applied with a display data signal, and the second pixel electrode is applied with an interference signal.

For example, in the driving method of the display panel according to an embodiment of the present disclosure, a same interference signal is applied through a same interference signal line to second pixel electrodes of the sub-pixels in a same row.

For example, in the driving method of the display panel according to an embodiment of the present disclosure, the display data signal is identical with or different from the interference signal.

For example, in the driving method of the display panel according to an embodiment of the present disclosure, in the event that the display data signal is different from the interference signal, a desired image brightness of each of the sub-pixels is equal to a sum of an image brightness of the display area and an image brightness of the interference area.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

DETAILED DESCRIPTION

Figure 1A:
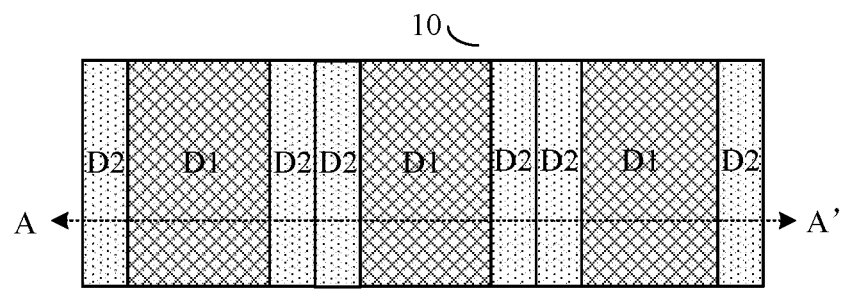
FIG. 1A is a schematic plan view of the structure of an exemplary display panel.

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art can obtain other embodiment, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Advanced super-dimensional field conversion (ADS) liquid crystal display panels have been widely used in various display devices such as notebook computers, tablet computers, ATMs and the like, due to their advantages of high color gamut, light weight, wide viewing angle, fast response time and the like. At present, a combination of an anti-spy function and a display function of, for example, a liquid crystal display panel to realize anti-spy display has become one of the research topics in the display field.

In order to realize an anti-spy display function, for example, an anti-spy display device may be disposed, for example, outside of the liquid crystal display device, so as to obtain an anti-spy display device formed by stacking a plurality of structure layers, but the anti-spy display device obtained by the above method has a complicated structure and a relatively great thickness, which is disadvantageous for lightening and thinning of the display device; or, for example, a backlight module may be designed such that the liquid crystal display device comprising the backlight module can switch between a narrow viewing angle display mode and a wide viewing angle display mode to realize the anti-spy display function, however, the structure of the backlight module required in above method is complicated, thereby higher requirements are imposed on the processing of the backlight module.

At least one embodiment of the present disclosure provides an array substrate, the array substrate comprises a plurality of sub-pixels arranged in an array, each of the sub-pixels comprises a display area and an interference area, the display area and the interference area are disposed side by side and configured to be independently driven, and the interference area is located on at least one side of the display area adjacent to a neighboring sub-pixel; the display area comprises a first pixel electrode, the interference area comprises a second pixel electrode, and the first pixel electrode is electrically insulated from the second pixel electrode.

In the array substrate according to at least one embodiment of the present disclosure, the display area and the interference area can be independently driven by disposing the first pixel electrode in the display area, disposing the second pixel electrode in the interference area, and making the first pixel electrode electrically insulated from the second pixel electrode, thereby for the display device comprising the array substrate, when the display area and the interference area work together, a narrow-viewing-angle anti-spy display function can be provided; and when the display area works alone, a normal wide-viewing-angle display function can be provided. Certainly, in at least one embodiment, the interference area can also work alone, but in this case, it is not possible or substantially impossible to provide a display effect.

Figure 1B:
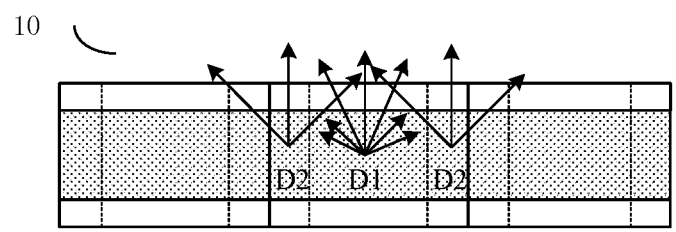
FIG. 1B is a schematic cross-sectional view taken along line A-A' of FIG. 1A.

At least one embodiment of the present disclosure provides a display panel, for example, as shown in FIG. 1A and FIG. 1B. The display panel 10 comprises a plurality of sub-pixels arranged in an array, and each sub-pixel comprises a display area D1 and an interference area D2 disposed side by side, the interference area D2 is located on at least one side of the display area D1 adjacent to a neighboring sub-pixel; the display area D1 and the interference area D2 can be independently driven, and the light emitted by the interference area D2 may be at least partially irradiated into adjacent sub-pixels, thereby forming interference and providing the anti-spy display function.

In the display panel 10 provided by at least one embodiment of the present disclosure, each of the sub-pixels of the display panel 10 includes a display area D1 and an interference area D2 that can be independently driven. For example, the display area D1 and the interference area D2 of the display panel 10 may be driven together such that the light emitted from the interference area D2 is at least partially irradiated into adjacent sub-pixels, thereby causing the display panel 10 to be in an anti-spy display mode; or, as required, for example, only driving the display area D1 of the display panel 10 to bring the display panel 10 into a non-anti-spy display mode. For example, based on the requirements of use scenarios, the display panel 10 can switch between the non-anti-spy display mode and the anti-spy display mode, and switching can be performed automatically or manually.

The disclosure is explained below with reference to some particular embodiments. In order to make the following description of the embodiments of the disclosure clear and concise, detailed descriptions of known functions and known components may be omitted. In a case where any one of the components of the embodiments of the present disclosure appears in more than one of the drawings, the one of the components may be denoted by the same reference numerals in each of the drawings.

Figure 2A:
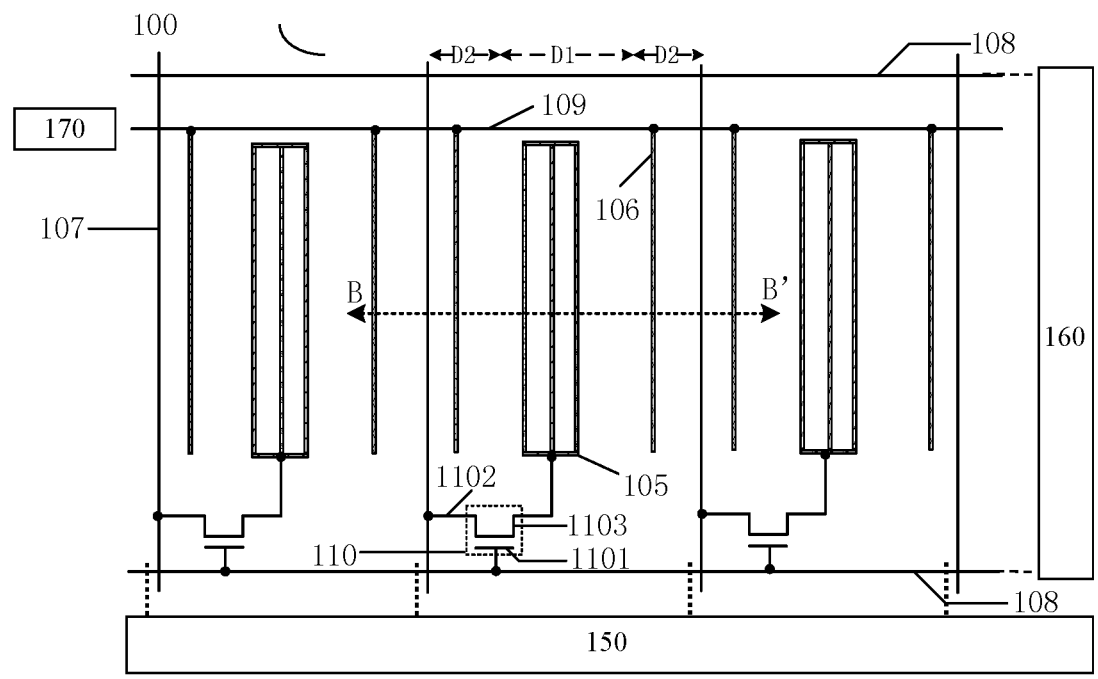
FIG. 2A is a schematic plan view of the structure of an array substrate according to a first example of an embodiment of the present disclosure.
Figure 2B:
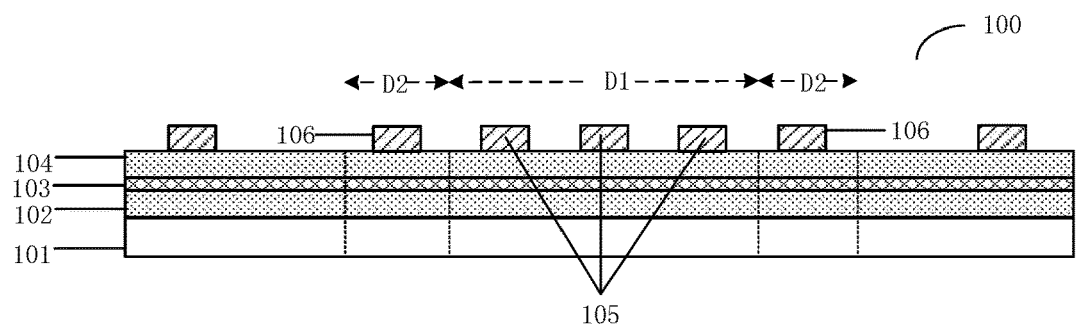
FIG. 2B is a schematic cross-sectional view taken along line B-IT of FIG. 2A.

An embodiment of the present disclosure provides an array substrate 100. For example, the array substrate 100 can be an array substrate of any type, such as a vertical electric field type array substrate, a horizontal electric field type array substrate, and the like. This embodiment does not limit the specific type of the array substrate. FIG. 2A is a schematic plan view of the structure of the array substrate 100, and FIG. 2B is a schematic cross-sectional view taken along line B-B' of FIG. 2A. For example, referring to FIG. 2A and FIG. 2B, the present embodiment is described by taking the horizontal electric field type array substrate as an example.

For example, as shown in FIG. 2A and FIG. 2B, the array substrate 100 includes a plurality of sub-pixels distributed in an array, each of the sub-pixels includes a display area D1 and an interference area D2 that can be independently driven, and the interference area D2 is located on at least one side of the display area D1 adjacent to a neighboring sub-pixel. As shown in FIG. 2A and FIG. 2B, the present embodiment is described by taking an example that the interference area D2 is located between the display area D1 and the sub-pixels adjacent to each side of the display area D1. As shown in FIG. 2A and FIG. 2B, the display area D1 in each of the sub-pixels includes a first pixel electrode 105, the interference area D2 in each of the sub-pixels includes a second pixel electrode 106, and the first pixel electrode 105 and the second pixel electrode 106 are electrically insulated from each other. For example, the materials of the first pixel electrode 105 and the second pixel electrode 106 may be metal materials or transparent conductive materials, and the transparent conductive materials may be any suitable materials such as indium tin oxide (ITO), indium zinc oxide (IZO) or the like, and this embodiment does not specifically limit this aspect.

For example, the array substrate 100 further includes a common electrode 103, so that the array substrate including liquid crystal driving electrodes composed of the first pixel electrode 105, the second pixel electrode 106 and the common electrode 103 is the horizontal electric field type array substrate 100. For example, the first pixel electrode 105 and/or the second pixel electrode 106 may be located in the same layer as the common electrode 103 or in a different layer from the common electrode 103. For example, as shown in FIG. 2B, the first pixel electrode 105 and the second pixel electrode 106 are located in a different layer from the common electrode 103, and the first pixel electrode 105 and the second pixel electrode 106 are strip type electrodes having a certain interval therebetween, and the common electrode 103 is a planar type electrode. For example, the material of the common electrode 103 includes a metal material or a transparent conductive material, and the transparent conductive material may be any suitable material such as indium tin oxide (ITO), indium zinc oxide (IZO) or the like, which is not specifically limited in this embodiment. For example, in one example, in a case where each of the first pixel electrode 105, the second pixel electrode 106 and the common electrode 103 is formed of a transparent conductive material, the array substrate 100 including the sub-pixels each includes the first pixel electrode 105, the second pixel electrode 106 and the common electrode 103 is the advanced super-dimensional field conversion type array substrate. The advanced super-dimensional field conversion type array substrate has a high aperture ratio and a high light transmittance. For example, the liquid crystal display panel composed of the advanced super-dimensional field conversion type array substrate has the advantages of wide viewing angle, high contrast, strong color expression, and the like.

Figure 2C:
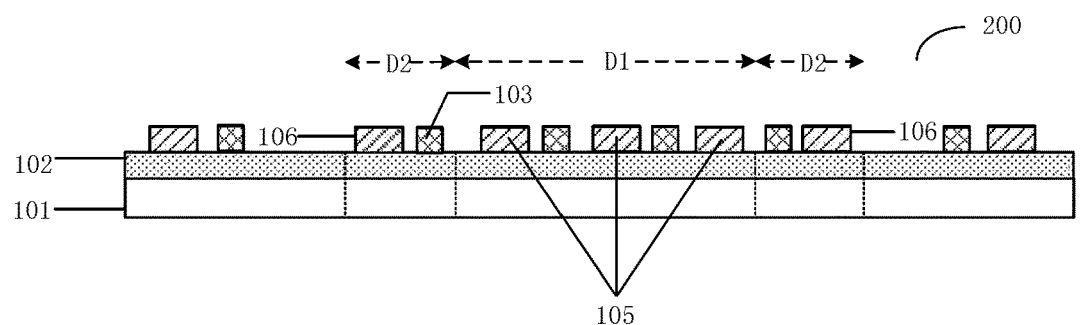
FIG. 2C is a schematic cross-sectional structural view of an array substrate according to a second example of an embodiment of the present disclosure.

Certainly, the positional relationship between the first pixel electrode 105, the second pixel electrode 106 and the common electrode 103 includes, but is not limited to, the case described above. For example, as shown in FIG. 2C, in another example, the first pixel electrode 105 and the second pixel electrode 106 are in the same layer as the common electrode 103. For example, the first pixel electrode 105 and the second pixel electrode 106 are strip type electrodes, the common electrode 103 is also a strip type electrode, and the common electrode 103 is interleaved with the first pixel electrode 105 and the second pixel electrode 106. For example, the material of the common electrode 103 includes a metal materials or a transparent conductive material, and for example, the materials of the first pixel electrode 105 and the second pixel electrode 106 include metal materials or transparent conductive materials, which is not specifically limited in this embodiment.

It should be noted that in the event that the first pixel electrode 105 and the second pixel electrode 106 are located in a different layer from the common electrode 103, the first pixel electrode 105 and the second pixel electrode 106 may also be strip type electrodes and the common electrode 103 may also be a strip type electrode. For example, the strip type first pixel electrode 105 and the strip type second pixel electrode 106 may be located above the common electrode 103 of the strip type, or the first pixel electrode 105 and the second pixel electrode 106 of the strip type may be located below the strip type common electrode 103, and this embodiment does not specifically limit this aspect.

As shown in FIG. 2A and FIG. 2B, the array substrate 100 further includes structures such as a plurality of data lines 107, a plurality of gate lines 108, an interference signal line 109, a thin film transistor 110, and the like. The data lines are connected to a data driving circuit 150 (for example, a data driving chip) to receive data voltage signals; the gate lines are connected to a gate driving circuit 160 (for example, a gate driving chip or a GOA type gate driving circuit) to receive gate scanning signals. For example, the data driving circuit and the gate driving circuit are further connected to a controller (for example, timing controller T-con) to receive scan control signals, timing control signals, data digital signals, and the like, so as to cooperate with each other to respectively provide data voltage signals and gate scanning signals to the pixel array, for example, driving the pixel electrodes in pixel units row by row for a display operation. The following embodiments of the present disclosure can be same in this respect, and the details are not described again.

For example, as shown in FIG. 2A and FIG. 2B, a plurality of gate lines 108 and a plurality of data lines 107 cross each other to define a plurality of sub-pixels, each of the sub-pixels includes, for example, a thin film transistor 110, and the thin film transistor 110 includes, for example, structure such as a gate electrode 1101, a source electrode 1102, a drain electrode 1103, and the like. For example, as shown in FIG. 2A and FIG. 2B, in each of the sub-pixels, the gate electrode 1101 of the thin film transistor 110 is electrically connected to a gate line 108, the source electrode 1102 of the thin film transistor 110 is electrically connected to a data line 107, and the drain electrode 1103 of the thin film transistor 110 is electrically connected to the first pixel electrode 105 of the display area D1. Of course, in another example, the gate electrode 1101 of the thin film transistor 110 may be electrically connected to the gate line 108, the drain electrode 1103 of the thin film transistor 110 may be electrically connected to the data line 107, and the source electrode 1102 of the thin film transistor 110 may be electrically connected to the first pixel electrode 105 of the display area D1.

As shown in FIGS. 2A and 2B, for the same row of the sub-pixels, the second pixel electrode 106 in the interference area D2 of each of the sub-pixels is electrically connected to the interference signal line 109, thereby receiving the same interference signals during operation. Thus, in each of the sub-pixels, under the control of gate signals, the data signals are loaded to the first pixel electrode 105 in the display area D1 through, for example, the drain electrode 1103 of the thin film transistor 110, thereby achieving independent driving of the display area D1. For example, the interference signal line 109 is connected to an interference signal generation circuit 170, and interference signals output from the interference signal generation circuit 170 are applied to the second pixel electrode 106 in the interference area D2 through the interference signal line 109, thereby achieving independent driving of the interference area D2. The interference signals are voltage signals. For example, the interference signals may be selected based on a range of the data voltage signal (for example, from a data voltage signal corresponding to a gray level of zero to a data voltage signal corresponding a maximum gray level), for example, selecting a data voltage corresponding to an intermediate gray level as the interference signal; for example, for gray levels of 0-255, the data voltage corresponding to the gray level of 127 is selected as the interference signal. Therefore, by controlling the thin film transistor 110 and the signal of the interference signal line 109, the display area D1 and the interference area D2 can be driven together or independently.

For example, as shown in FIG. 2A and FIG. 2B, the array substrate 100 may further include a buffer layer 102, an insulating layer 104, and the like as required.

The buffer layer 102 is disposed on the base substrate 101, and for example, the buffer layer 102 can prevent impurity ions in the base substrate 101 from diffusing into a circuit layer including the thin film transistor 110 and the like formed later, and prevent affecting characteristics such as threshold voltage, leakage current and the like of the thin film transistor 110; additionally, for example, the buffer layer 102 can also planarize the surface of the base substrate 101. For example, the material of the buffer layer 102 includes SiNx, SiOx, or other suitable materials, which is not specifically limited in this embodiment.

For example, as shown in FIG. 2B, the insulating layer 104 is disposed between the common electrode 103 and both of the first pixel electrode 105 and the second pixel electrode 106 to electrically insulate the first pixel electrode 105 and the second pixel electrode 106 from the common electrode 103. For example, the material of the insulating layer 104 includes SiNx, SiOx or other suitable materials, which is not specifically limited in this embodiment.

It should be noted that, for clarity, the entire structure of the array substrate 100 is not shown in drawings. In order to realize necessary functions of the array substrate, those skilled in the art can dispose other structures not shown according to specific application scenarios, which is not limited by the embodiment of the present disclosure.

In the array substrate 100 provided by at least one embodiment of the present disclosure, each of sub-pixel includes the display area D1 and the interference area D2, and the interference area D2 is located between the display area D1 and adjacent sub-pixels. The first pixel electrode 105 is disposed in the display area D1 and electrically connected to the drain electrode 1103 of the thin film transistor 110, and the second pixel electrode 106 is disposed in the interference area D2 and electrically connected to the interference signal line 109, thereby the display area D1 and the interference area D2 can be independently driven.

Figure 3A:
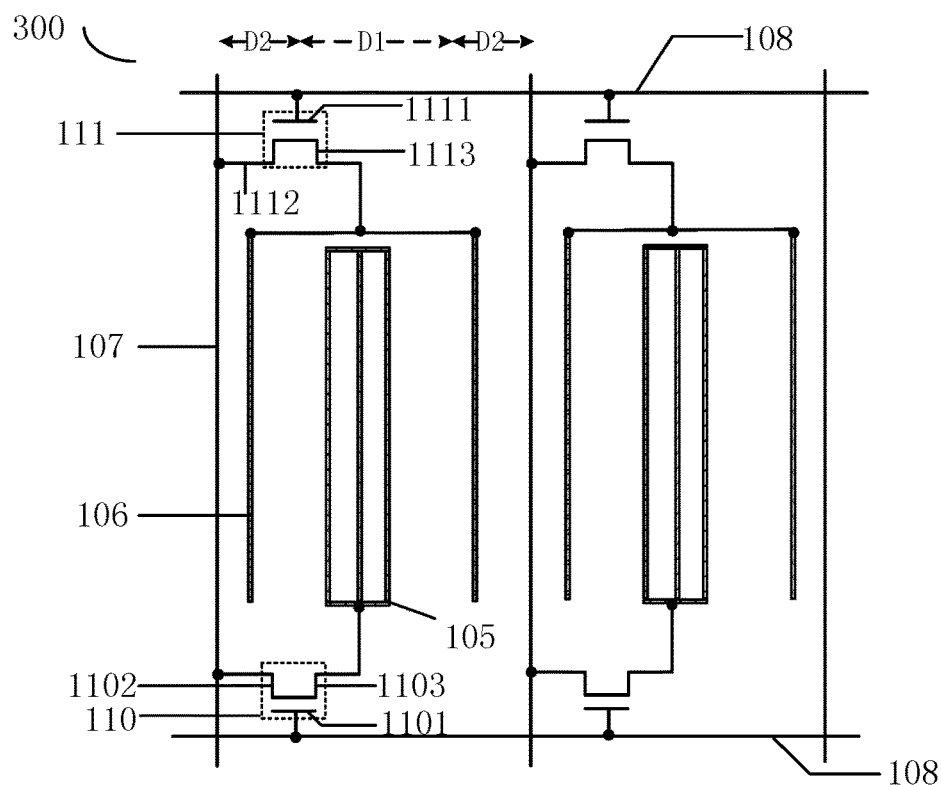
FIG. 3A is a schematic plan view of the structure of an array substrate according to a third example of an embodiment of the present disclosure.

FIG. 3A is a schematic plan view showing the structure of an array substrate 300 according to another example of the embodiment. Referring to FIG. 3A, except that the signal connection end of the second pixel electrode 106 in the interference area D2 of the array substrate 300 shown in FIG. 3A is different from that shown in FIG. 2A, the structure of the array substrate 300 of this example may be substantially the same as the structure of the array substrate 100 described in FIG. 2A.

As shown in FIG. 3A, the plurality of gate lines 108 and the plurality of data lines 107 of the array substrate 300 cross each other to define a plurality of sub-pixels, and each of the sub-pixels includes a first thin film transistor 110 and a second thin film transistor 111. The first thin film transistor 110 includes, for example, structures such as a gate electrode 1101, a first terminal 1102, a second terminal 1103 and the like; and the second thin film transistor 111 includes, for example, structures such as a gate electrode 1111, a first terminal 1112, a second terminal 1113 and the like. In this embodiment, the first terminal may be, for example, a source electrode, and the second terminal may be, for example, a drain electrode; or the first terminal may be, for example, a drain electrode, and the second terminal may be, for example, a source electrode; which is not limited by this embodiment. In this embodiment, this embodiment is described by taking that the first terminal is a source electrode and the second terminal is a drain electrode as an example.

As shown in FIG. 3A, each of the sub-pixels is defined by two gate lines and two data lines, a gate electrode 1101 of the first thin film transistor 110 is electrically connected to one of the two gate lines, and a gate electrode 1111 of the second thin film transistor 111 is electrically connected to another one of the two gate lines; a drain electrode 1103 of the first thin film transistor 110 is electrically connected to the first pixel electrode 105, and a drain electrode 1113 of the second thin film transistor 111 is electrically connected to the second pixel electrode 106; and a source electrode 1102 of the first thin film transistor 110 and the source electrode 1112 of the second thin film transistor 111 are electrically connected to the same data line. Since the gate electrode of the first thin film transistor 110 and the gate electrode of the second thin film transistor 111 are respectively electrically connected to different gate lines 108, the display area D1 and the interference area D2 can be independently driven under the control of the gate signal. For example, in a case where two gate lines 108 are loaded with the same signals, the first thin film transistor 110 and the second thin film transistor 111 are both turned on, the data signals are respectively applied to the first pixel electrode 105 and the second pixel electrode 106 by the source electrode 1102 of the first thin film transistor 110 and the source electrode 1112 of the second thin film transistor 111, and the display area D1 and the interference area D2 are driven together. Driving signals of the display area D1 and the interference area D2 are the same because the first thin film transistor 110 and the second thin film transistor 111 are electrically connected to the same data line. For example, as required, the first thin film transistor 110 may be turned on and the second thin film transistor 111 may be turned off by controlling gate signals, and in this case, data signals are only applied to the first pixel electrode 105, thereby the display area D1 is driven and the interference area D2 is not driven.

In the array substrate 300 according to at least one example of the present embodiment, each of the sub-pixels includes the first thin film transistor 110 and the second thin film transistor 111, the drain electrode 1103 of the first thin film transistor 110 is electrically connected to the first pixel electrode 105, and the drain electrode 1113 of the second thin film transistor 111 is electrically connected to the second pixel electrode 106, so that the display area D1 and the interference area D2 in each of the sub-pixels can be independently driven. The source electrode 1102 of the first thin film transistor 110 and the source electrode 1112 of the second thin film transistor 111 are both electrically connected to the same data line 107, therefore, the display area D1 and the interference area D2 can receive the same driving signals.

Figure 3B:
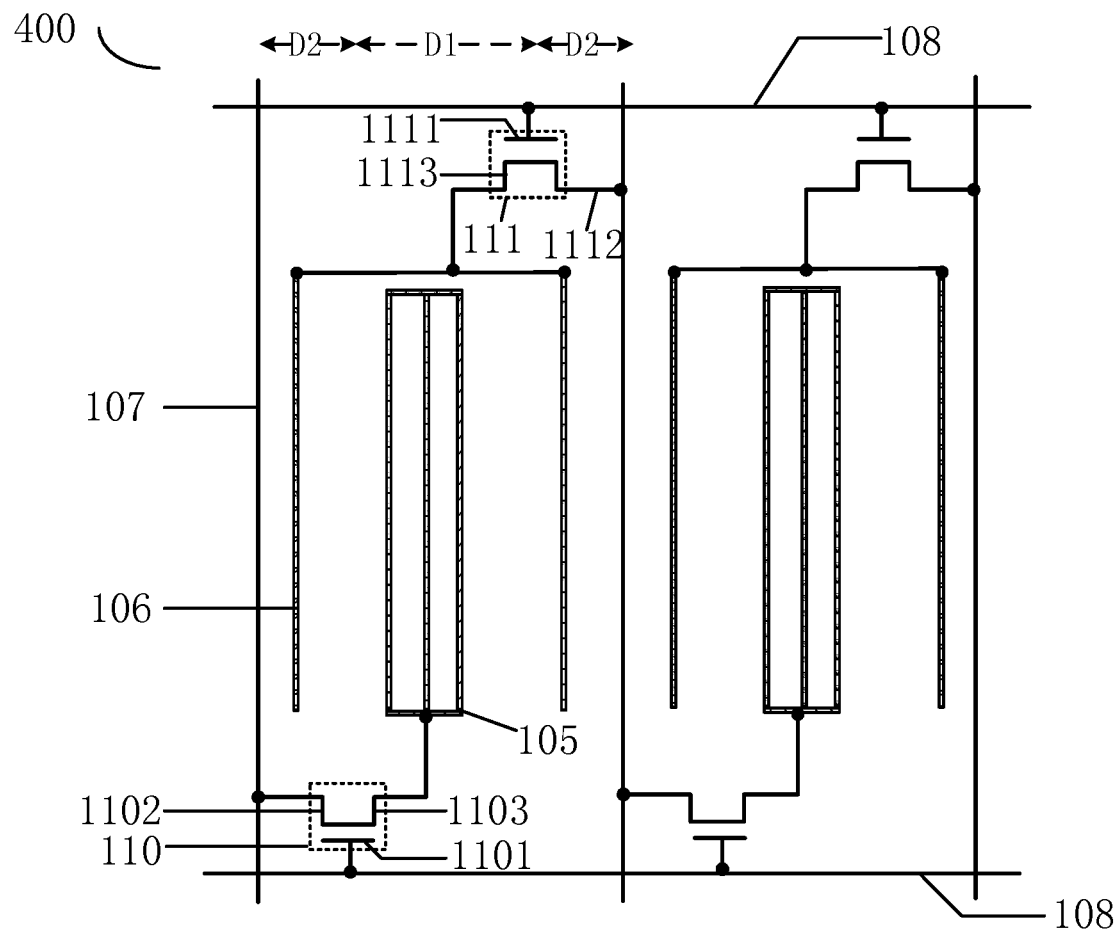
FIG. 3B is a schematic plan view of the structure of an array substrate according to a fourth example of an embodiment of the present disclosure.

FIG. 3B is a schematic plan view of the structure of an array substrate 400 according to another example of the embodiment. Referring to FIG. 3B, except that the source electrode 1102 of the first thin film transistor 110 and the source electrode 1112 of the second thin film transistor 111 of the array substrate 400 are connected to different data lines as shown in FIG. 3B, the structure of the array substrate 400 of this example and the structure of the array substrate 300 described in FIG. 3A may be substantially the same.

As shown in FIG. 3B, each of the sub-pixels of the array substrate 400 is defined by two gate lines and two data lines, the gate electrode 1101 of the first thin film transistor 110 is electrically connected to one of the two gate lines 108, and the gate electrode 1111 of the second thin film transistor 111 is electrically connected to another of the two gate lines 108; the drain electrode 1103 of the first thin film transistor 110 is electrically connected to the first pixel electrode 105, and the drain electrode 1113 of the second thin film transistor 111 is electrically connected to the second pixel electrode 106; and the source electrode 1102 of the first thin film transistor 110 is electrically connected to one of the two data lines 107, and the source electrode 1112 of the second thin film transistor 111 is electrically connected to another of the two data lines 107. Under the control of the gate signals and the data signals, the display area D1 and the interference area D2 can be independently driven. The driving signals of the display area D1 and the interference area D2, for example, can be different because the first thin film transistor 110 and the second thin film transistor Ill are electrically connected to different data lines.

Figure 4:
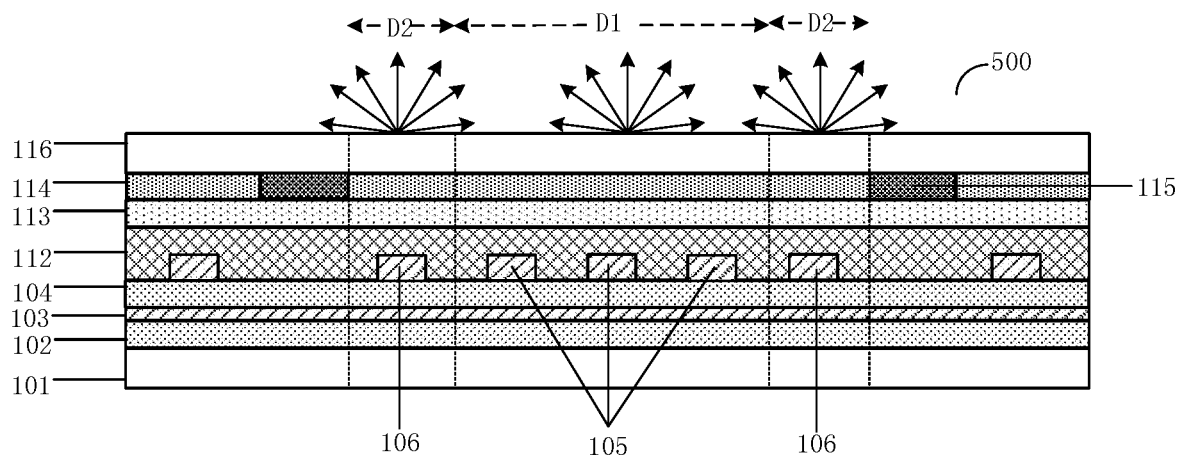
FIG. 4 is a cross-sectional structural view of a display panel according to another embodiment of the present disclosure.

Another embodiment of the present disclosure provides a display panel 500, which includes any one of the array substrates described in the above embodiments, and FIG. 4 is a schematic cross-sectional view of the display panel 500. For example, the display panel 500 may be a vertical electric field type display panel or a horizontal electric field type display panel, and this embodiment does not limit the specific type of the display panel. This embodiment is described by taking a horizontal electric field type display panel as an example.

As shown in FIG. 4, the display panel 500 includes, for example, structures such as an opposite substrate 116, a liquid crystal layer 112, a color filter layer 114, a black matrix 115, and the like.

As shown in FIG. 4, the opposite substrate 116 is disposed opposite to the base substrate 101, and for example, the material of the opposite substrate 116 includes inorganic insulating materials such as SiNx, SiOx, glass or organic insulating materials such as resin material, polyester material, polyimide, or other suitable materials, which is not limited in this embodiment.

As shown in FIG. 4, the liquid crystal layer 112 is disposed between the base substrate 101 and the opposite substrate 116. Since the first pixel electrode 105 and the second pixel electrode 106 and the common electrode 103 are disposed on the array substrate, and in a case where voltages is applied to the first pixel electrode 105 and the second pixel electrode 106 and the common electrode 103, a horizontal electric field is formed between the first pixel electrode 105, the second pixel electrode 106 and the common electrode 103, and liquid crystal molecules are oriented in the direction of the electric field to rotate in a plane. For example, in a case where external light (for example, light provided by a backlight) is irradiated on the display panel 500 from the side on which the substrate 101 is located, the light is in an (elliptical) circular polarization state after passing through a lower polarizer and the liquid crystal layer 112, thereby the light can emit through an upper polarizer. Since the liquid crystal molecules are rotated in a plane to realize image display, the horizontal electric field type display panel 500 has a characteristic of wide viewing angle. For example, in a case where a contrast of the display panel 500 is greater than 10, the viewing angle of the display panel can be, for example, 160° or greater.

As shown in FIG. 4, the color filter layer 114 is disposed on a side of the opposite substrate 116 facing the base substrate 101, and the color filter layer 114 includes array-distributed RGB color filters. For example, each of the color filters is disposed in a one-to-one correspondence with each of the sub-pixels, so that the display panel 500 including the color filter layer 114 realizes color display. Of course, colors of the color filter layer 114 include and are not limited to three colors such as red, green and blue, and the colors of the color filter layer 114 are not specifically limited in this embodiment.

As shown in FIG. 4, the black matrix 115 is disposed between adjacent sub-pixels. For example, the black matrix 115 may be used to block light which is not controlled by the deflection of the liquid crystal layer 112 and other light which has an effect on the display effect. For example, the light provided by the backlight source may be irradiated onto the display area D1 and the interference area D2 in each of the sub-pixels of the display panel 500; the black matrix 115 comprises a black matrix line disposed between adjacent sub-pixels, and the line width of the black matrix line of the black matrix 115 may allow at least a portion of light emitted from the interference area D2 of each of the sub-pixels to be irradiated into the adjacent sub-pixels. For example, in one example, the line width of the black matrix line may be c=a+2*b, where "c" is the line width of the black matrix line, "a" is a width of the data line 107, and "b" is an alignment error. The material of the black matrix 115 includes and is not limited to carbon black particles or metal materials (for example, chromium) or metal oxide materials (or chromium oxide) covered by organic resin materials.

For example, in a case where the display panel 500 includes the array substrate 100 described above in FIG. 2A, for example, if both the display area D1 and the interference area D2 are driven, since the display panel is the horizontal electric field type display panel 500, the interference area D2 and the display area D1 both provide wide viewing angle display. The interference area D2 is located on both sides of the display area D1 and is designed to match the line width of the black matrix line, so that the light of large viewing angles in the interference area D2 may enter adjacent sub-pixels. For example, as shown in FIG. 4, for example, the middle sub-pixel may be a green sub-pixel, and the sub-pixels on both sides of the green sub-pixel may respectively be, for example, a red sub-pixel and a blue sub-pixel. For example, in a case where the display area D1 and the interference area D2 in the green sub-pixel are driven while the adjacent red sub-pixel and blue sub-pixel are not driven, since there is no crosstalk of light of adjacent sub-pixels, observers observing within a range of anti-spy angles (for example, above the green sub-pixel) can only see images displayed by the green sub-pixel, that is, the observers see correct image information. In case of viewing outside the range of anti-spy angles (for example, from the side of the green sub-pixel), since the large-angle light in the interference area D2 can enter adjacent sub-pixels, observers see that all of the green sub-pixel, the red sub-pixel and blue sub-pixels are displaying, that is, the observers see wrong image information. In this case, since light leakage of adjacent sub-pixels is visually caused, the display panel may have phenomena such as color shift of a large viewing angle, white display content, decrease in contrast, and the like, and normal display requirements cannot be satisfied, thereby achieving the anti-spy display function.

It should be noted that in FIG. 4, an area ratio of the display area D1 to the interference area D2 in each of the sub-pixels is only exemplarily shown and does not represent actual area ratio of the display area D1 to the interference area D2. For example, in actual manufacturing processes, the area occupied by the interference area D2 in each of the sub-pixels is small compared to the display area D1, so even when the display panel is in an anti-spy display mode and observers view within a range of anti-spy angles (for example, directly above the display panel), light emitted by the interference area D2 in each of the sub-pixels does not affect the viewing effect for the observers. For example, as required, it is also possible to select only driving the display area D1 without driving the interference area D2. In this case, only the display area D1 displays image information, and there is not interference light entering adjacent sub-pixels. Therefore, the display panel 500 is in a wide viewing angle display mode without the anti-spy display function. Display parameters such as contrast, color gamut, viewing angle and the like of the display panel 500 in the display mode may be consistent with conventional in-plane conversion type liquid crystal display panels or advanced super-dimensional field conversion type liquid crystal display panels, and related description will not be repeated herein.

In the above embodiment, in the anti-spy display mode, the thin film transistor 110 is electrically connected to the first pixel electrode 105 of the display area D1, and the interference signal line 109 is electrically connected to the second pixel electrode 106 of the interference area D2. Since the data signals of the data line 107 electrically connected to the thin film transistor 110 may be different from the interference signals of the interference signal line 109, there may be some slight difference between the image brightness of the interference area D2 and the image brightness of the display area D1.

In order to further optimize the image display effect of the display panel in the anti-spy display mode, for example, in another example of the embodiment, the array substrate in the display panel 500 may be, for example, the array substrate 300 described above in FIG. 3A.

In a case where the display panel 500 includes the array substrate 300 described in FIG. 3A, in the display panel 500, each of the sub-pixels is defined by two gate lines and two data lines, each of sub-pixel includes the first thin film transistor 110 and the second thin film transistors 111. The gate electrode 1101 of the first thin film transistor 110 is electrically connected to one of the two gate lines, and the gate electrode 1111 of the second thin film transistor 111 is electrically connected to another one of the two gate lines; the drain electrode 1103 of the first thin film transistor 110 and the first pixel electrode 105 are electrically connected, and the drain electrode 1113 of the second thin film transistor 111 is electrically connected to the second pixel electrode 106; and the source electrode 1102 of the first thin film transistor 110 and the source electrode 1112 of the second thin film transistor 111 are electrically connected to the same data line. For example, in a case where both the display area D1 and the interference area D2 are driven, since the first thin film transistor 110 and the second thin film transistor 111 are electrically connected to the same data line 107, driving signals of the display area D1 and the interference area D2 are the same, that is, the image display brightness of the area D1 and the interference area D2 is the same. Therefore, in a normal viewing angle range, overall image brightness uniformity of the display panel seen by observer is better, thereby optimizing the image display effect of the display panel 500 in the anti-spy display mode. Outside the normal viewing angle range, since light of large viewing angle of the interference area D2 enters adjacent sub-pixels, light leakage of adjacent pixels is caused, thereby causing phenomena such as color shift of a large viewing angle, white display content, decrease in contrast, and the like, and normal display requirements cannot be satisfied, thereby achieving the anti-spy display function.

For example, as required, the first thin film transistor 110 may be turned on and the second thin film transistor 111 may be turned off by controlling gate signals, in this case, data signals are only applied to the first pixel electrode 105, so that the display area D1 is driven and the interference area D2 is not driven. In this case, only the display area D1 displays image information, and interference light cannot enter adjacent sub-pixels, so the display panel 500 is in a wide viewing angle display mode without the anti-spy function.

For example, as shown in FIG. 4, the display panel 500 further includes a planarization layer 113, which is disposed between the base substrate 101 and the opposite substrate 116. For example, the exit angle of interference light may be controlled by controlling the thickness of the planarization layer 113. For example, in the display panel 500 provided in this embodiment, the angle of the interference light emitted from the interference area D2 is related to factors such as the position of the interference area D2, the width of the black matrix 115 and the thickness of the display panel. In this case, in order to match the shading effect of the display panel, the width of the black matrix 115 has been roughly determined, for example, by the above calculation, and the position of the interference area D2 is also difficult to adjust, therefore, the thickness of the planarization layer 113 may be appropriately increased or decreased so as to adjust the thickness of the display panel, thereby achieving the adjustment of the exit angle of the interference light. For example, in an example, the exit angle of the interference light can be reduced by increasing the thickness of the planarization layer 113. For example, the material of the interference layer 113 includes any suitable materials such as SiNx, SiOx, and the like, which is not limited in this embodiment.

It should be noted that, for clearly, the entire structure of the display panel 500 is not shown in the figures. In order to realize necessary functions of the display panel, the skilled in the art may dispose other structures not shown according to the specific application scenario, which is not limited by the embodiment of the present disclosure.

In the display panel 500 according to at least one embodiment of the present disclosure, the display area D1 and the interference area D2 in each of the sub-pixels can be independently driven. In a case where the display area D1 and the interference area D2 are driven together, the display panel 500 is in an anti-spy display mode of a wide viewing angle; and in a case where only the display area D1 is driven, the display panel 500 is in a wide viewing angle display mode without the anti-spy effect. The display panel can switch between the abovementioned modes as required.

In addition, in at least one example, each of the sub-pixels of the display panel 500 includes the first thin film transistor 110 and the second thin film transistor 111, the drain electrode 1103 of the first thin film transistor 110 is electrically connected to the first pixel electrode 105, and the drain electrode 1113 of the second thin film transistor 111 is electrically connected to the second pixel electrode 106, and the source electrodes of the first thin film transistor 110 and the second thin film transistor 111 are both connected to the same data line 107, so that the image brightness of the display area D1 and the interference area D2 are the same, thereby the display effect of the display panel in the anti-spy display mode can be further optimized.

Other technical effects of the display panel 500 according to this embodiment can refer to technical effects of any one of the array substrates described in the foregoing embodiments, which will not be repeated herein.

For example, at least one embodiment of the present disclosure further provides a display panel including a plurality of sub-pixels arranged in an array, wherein each of sub-pixel includes a display area D1 and an interference area D2 disposed side by side, and the interference area D2 is located at least one side of the display area adjacent to a neighboring sub-pixel; wherein the display area D1 and the interference area D2 are independently driven, and at least a portion of light emitted from the interference area D2 may be irradiated into adjacent sub-pixels.

For example, the embodiment further provides an electronic device including any one of the display panels described in the above embodiments. For example, the electronic device may be any product or component having an anti-spy display function such as a tablet computer, a notebook computer, a video camera, a navigator and the like. Technical effects of the electronic device can refer to technical effects of the array substrate or the display panel described in ally one of above embodiments, which will not be repeated herein.

Figure 5A:
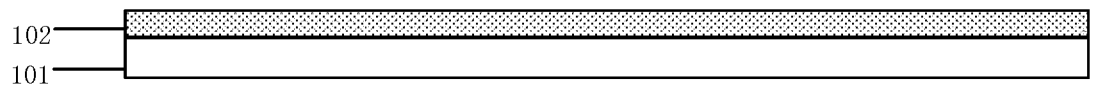
FIGS. 5A-5C are schematic cross-sectional structural views of an array substrate in a manufacturing process according to another embodiment of the present disclosure.
Figure 5B:
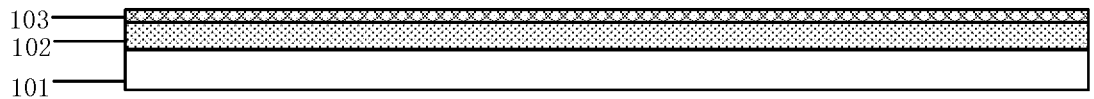
Figure 5C:
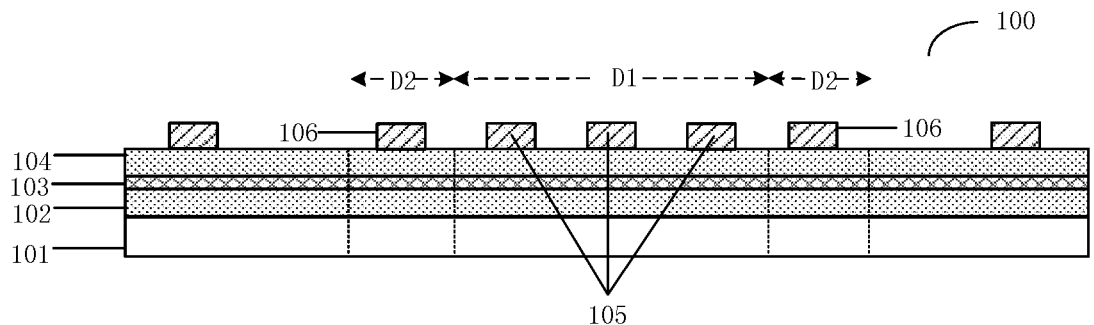

At least one embodiment of the present disclosure provides a method of manufacturing an array substrate 100, and FIGS. 5A-5C are cross-sectional views of the array substrate 100 during the manufacturing process.

As shown in FIG. 5A, a base substrate 101 is provided, for example, the base substrate 101 may be a glass substrate, a quartz substrate, a plastic substrate, or a substrate including other suitable materials, which is not specifically limited in this embodiment.

As shown in FIG. 5A, a buffer layer 102 is formed on the base substrate 101 by, for example, chemical vapor deposition, physical vapor deposition, or the like. For example, the buffer layer 102 can prevent impurity ions in the base substrate 101 from diffusing into a circuit layer including the thin film transistor and the like formed later, and prevent affecting characteristics such as threshold voltage, leakage current and the like of the thin film transistor; additionally, for example, the buffer layer 102 can also planarize the surface of the base substrate 101. For example, the material of the buffer layer 102 includes SiNx, SiOx, or other suitable materials, which is not specifically limited in this embodiment.

As shown in FIG. 5B, a metal layer is formed on the buffer layer 102 by, for example, chemical vapor deposition, physical vapor deposition, or the like, and the metal layer is patterned by a photolithography process to form a common electrode 103 of a planar shape. For example, the material of the common electrode 103 may be a metal material or a transparent conductive material, and the transparent conductive material may be, for example, any suitable material such as indium tin oxide (ITO), indium zinc oxide (IZO) or the like.

As shown in FIG. 5C, an insulating film is formed on the common electrode 103 by, for example, chemical vapor deposition, physical vapor deposition, or the like, and the insulating film is patterned by a photolithography process or the like to form an insulating layer 104. For example, the material of the insulating layer 104 includes SiNx, SiOx, or other suitable materials, which is not limited in this embodiment.

As shown in FIG. 5C, a metal layer is formed on the insulating layer 104 by, for example, chemical vapor deposition, physical vapor deposition, or the like, and a first pixel electrode 105 and a second pixel electrode 106 are formed on the insulating layer 104 by patterning the metal layer. The first pixel electrode 105 is located in the display area D1, the second pixel electrode 106 is located in the interference area D2, and the first pixel electrode 105 and the second pixel electrode 106 are electrically insulated from each other. For example, materials of the first pixel electrode 105 and the second pixel electrode 106 may be metal materials or transparent conductive materials, and the transparent conductive materials may be any suitable materials such as indium tin oxide (ITO), indium zinc oxide (IZO) or the like, and this embodiment does not specifically limit this aspect.

In the method of manufacturing the array substrate 100 according to at least one embodiment of the present disclosure, each of sub-pixel includes a display area D1 and an interference area D2. The first pixel electrode 105 is formed in the display area D1, and the second pixel electrode 106 is formed in the interference area D2, thereby the display area D1 and the interference area D2 can be independently driven.

Figure 6:
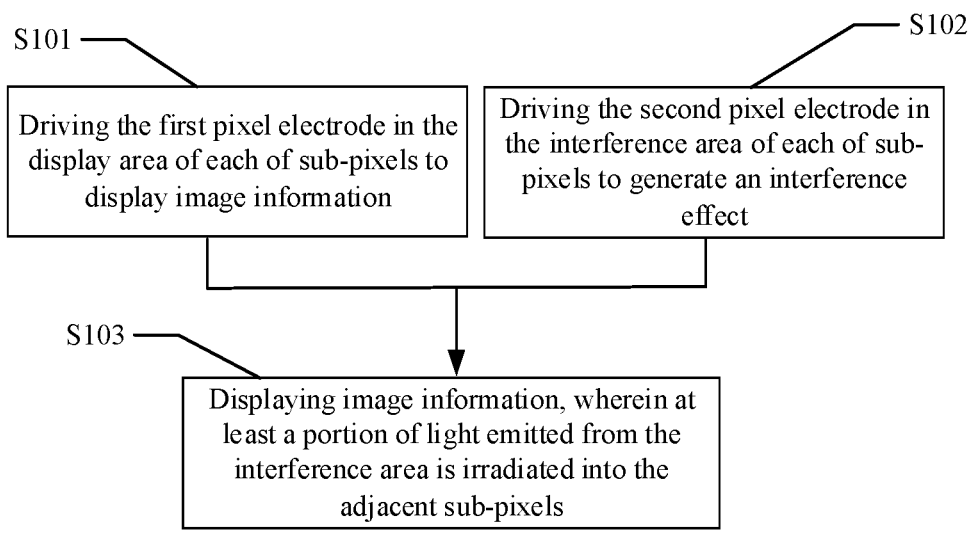
FIG. 6 is a flowchart of a driving method of a display panel according to another embodiment of the present disclosure.

Still another embodiment of the present disclosure provides a flowchart of a driving method of a display panel, and the driving method can be used, for example, in the display panel of any one of above embodiments. FIG. 6 is a flowchart of a driving method of a display panel according to this embodiment. As shown in FIG. 6, the driving method of the display panel includes the following steps.

Step S101: Driving the first pixel electrode 105 in the display area D1 of each of the sub-pixels to display image information.

Step S102: Driving the second pixel electrode 106 in the interference area D2 of each of the sub-pixels to generate an interference effect.

Step S103: Displaying image information, wherein at least a portion of light emitted from the interference area D2 is irradiated into the adjacent sub-pixels.

For example, in a case where both the display area D1 and the interference area D2 of the display panel are driven, since light of large viewing angles of the interference area D2 enters adjacent sub-pixels, light leakage of adjacent pixels is caused, thereby causing phenomena such as color shift of a large viewing angle, white display content, decrease in contrast, and the like, and normal display requirements cannot be satisfied, thereby the display panel can the achieve anti-spy display function.

For example, in a case where the first pixel electrode 105 in the display area D1 of the display panel is electrically connected to the thin film transistor 110 and the second pixel electrode 106 in the interference area D2 is electrically connected to the interference signal line 109, the data line 107 can apply display data signals to the first pixel electrode 105 through the electrical connection with the source electrode 1102 of the thin film transistor 110, and since the display data signals applied by the data line 107 and the interference signals applied by the interference line 109 are likely to be different, there is a difference between the image brightness of the interference area D2 and the image brightness of the display area D1. In order to reduce the influence of the interference area D2 on normal display effect in the range of the anti-spy angle, for example, the image brightness can be pre-processed. For example, assuming that the image brightness required for sub-pixels is V, the interference signals may be preset such that the image brightness of the interference area D2 is V1, and the display data signal may be preset such that the image brightness of the display area D1 is V-V1, thereby a sum of the image brightness of the display area D1 and that of the interference area D2 is the image brightness required for sub-pixels, so that uniformity of the image brightness of the display panel in the anti-spy display mode can be improved.

Alternatively, in order to further optimize the image brightness uniformity of the display panel in the anti-spy display mode, each of the sub-pixels of the display panel may include, for example, two thin film transistors, i.e., a first thin film transistor 110 and a second thin film transistor 111. The first thin film transistor 110 is electrically connected to a first pixel electrode 105 of the display area D1, and a second thin film transistor 111 is electrically connected to a second pixel electrode 106 of the interference area D2, and the source electrodes of the first thin film transistor 110 and the second thin film transistor 111 are electrically connected to the same data line 107. In this case, driving signals of the display area D1 and the interference area D2 are the same, and thus the image display brightness of the display area D1 and the interference area D2 is the same, thereby further optimizing the image brightness uniformity of the display panel in the anti-spy display mode.

The various embodiments of the present disclosure and the features of these embodiments may be combined with each other to obtain a new embodiment on a non-conflicting basis.

The above description is only an exemplary embodiment of the present disclosure, and is not intended to limit the scope of the present disclosure, and the scope of the present disclosure is defined by the appended claims.

What is claimed is:

1. A display panel, comprising an array substrate, a liquid crystal layer, and an opposite substrate,
   wherein the opposite substrate is disposed opposite to the array substrate, and the liquid crystal layer is sandwiched between the opposite substrate and the array substrate;
   the array substrate comprises a plurality of sub-pixels arranged in an array;
   each of the sub-pixels comprises a display area and an interference area, the display area and the interference area are disposed side by side and configured to be independently driven, and the interference area is located on at least one side of the display area adjacent to a neighboring sub-pixel;
   the display area comprises a first pixel electrode, the interference area comprises a second pixel electrode, and the first pixel electrode is electrically insulated from the second pixel electrode;
   the display area and the interference area are configured so that in a case where each of the display area and the interference area is driven, light emitted from the interference area and transmitted through the opposite substrate interferes with light from an adjacent pixel to allow the display panel have a first viewing angle, and in a case where the display area is driven and the interference area is not driven, the display panel has a second viewing angle, wherein the first viewing angle is smaller than the second viewing angle;

the display panel further comprises a black matrix on the opposite substrate; and the black matrix comprises a black matrix line disposed between adjacent sub-pixels, and a line width of the black matrix line allows at least a portion of light emitted from the interference area of each of the adjacent sub-pixels to be irradiated into the adjacent sub-pixels, and the black matrix is absent in the interference area.

2. The display panel according to claim 1, wherein the line width of the black matrix line is equal to a sum of a line width of the data line and a double of an alignment error of the black matrix.

3. The display panel according to claim 1, further comprising a planarization layer between the array substrate and the opposite substrate, wherein a thickness of the planarization layer enables the portion of the light after passing through the planarization layer to be irradiated into the adjacent sub-pixels.

4. The display panel according to claim 1, wherein the opposite substrate is a color filter substrate.

5. The display panel according to claim 1, wherein each of the sub-pixels further comprises a common electrode, and at least one of the first pixel electrode and the second pixel electrode is located in a same layer as the common electrode or in a different layer from the common electrode.

6. The display panel according to claim 1, wherein the interference area is located between the display area and the neighboring sub-pixel on each side of the display area.

7. The display panel according to claim 1, wherein the array substrate further comprises a plurality of gate lines and a plurality of data lines;

the plurality of gate lines and the plurality of data lines cross each other to define the plurality of sub-pixels;

each of the sub-pixels comprises a first thin film transistor and a second thin film transistor;

a first terminal of the first thin film transistor is electrically connected to the first pixel electrode, and a first terminal of the second thin film transistor is electrically connected to the second pixel electrode;

a gate electrode of the first thin film transistor and a gate electrode of the second thin film transistor are electrically connected to different gate lines; and a second terminal of the first thin film transistor and a second terminal of the second thin film transistor are electrically connected to a same data line or connected to different data lines, respectively.

8. An electronic device, comprising the display panel according to claim 1.

9. A driving method of the display panel according to claim 1, comprising:

driving the first pixel electrode of the display area of each of the sub-pixels to display image information; and driving the second pixel electrode of the interference area of each of the sub-pixels to produce an interference effect.

10. The driving method according to claim 9, wherein the first pixel electrode is applied with a display data signal, and the second pixel electrode is applied with an interference signal.

11. The driving method according to claim 10, wherein a same interference signal is applied through a same interference signal line to second pixel electrodes of the sub-pixels in a same row.

12. The driving method according to claim 10, wherein the display data signal is identical with or different from the interference signal.

13. The driving method according to claim 12, wherein in an event that the display data signal and the interference signal which is different from the display data signal are respectively applied to the first pixel electrode and the second pixel electrode through different data lines, a desired image brightness of each of the sub-pixels is equal to a sum of an image brightness of the display area and an image brightness of the interference area.

\* \* \* \* \*